(12) United States Patent
Bansal et al.

(10) Patent No.: US 7,697,441 B2
(45) Date of Patent: Apr. 13, 2010

(54) COMPUTER SYSTEM WITH BLACK HOLE MANAGEMENT

(75) Inventors: Deepak Bansal, Redmond, WA (US); Sanjay N. Kaniyar, Redmond, WA (US); Xinyan Zan, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 882 days.

(21) Appl. No.: 11/412,612

(22) Filed: Apr. 27, 2006

(65) Prior Publication Data

US 2007/0253335 A1 Nov. 1, 2007

(51) Int. Cl.
*H04L 1/00* (2006.01)
(52) U.S. Cl. ..................................... 370/241
(58) Field of Classification Search ................. 370/238, 370/241
See application file for complete search history.

(56) References Cited

U.S. PATENT DOCUMENTS

| | | | |
|---|---|---|---|
| 6,032,193 A * | 2/2000 | Sullivan | 709/239 |
| 6,741,554 B2 * | 5/2004 | D'Amico et al. | 370/225 |
| 2002/0018480 A1 * | 2/2002 | Galicki et al. | 370/401 |
| 2003/0074453 A1 * | 4/2003 | Ikonen | 709/228 |
| 2003/0108045 A1 * | 6/2003 | Jayam et al. | 370/394 |
| 2004/0230832 A1 * | 11/2004 | McCallam et al. | 713/201 |
| 2005/0267928 A1 * | 12/2005 | Anderson et al. | 709/200 |

* cited by examiner

*Primary Examiner*—Derrick W Ferris
*Assistant Examiner*—Mang Yeung
(74) *Attorney, Agent, or Firm*—Wolf, Greenfield & Sacks, P.C.

(57) ABSTRACT

A computer system with black hole management. The black hole management system shares black hole status information among connections that employ the same path. The black hole status information may indicate either that a black hole exists on the path or that communications have been performed successfully on the path, indicating that no black hole exists. By sharing this information, delays in transmission caused by black hole probing may be reduced. Additionally, status information for a connection is reset when information indicates that the connection has been altered. By resetting the status information, delays in transmission associated with sending reduced sized packets over connections for which black holes were previously detected but may have been eliminated by changes in the connection, are avoided.

19 Claims, 6 Drawing Sheets

COMPUTER SYSTEM WITH BLACK HOLE MANAGEMENT

BACKGROUND

Networks that allow computers to exchange data are widely used. In a typical network, a packet transmitted by a source computer passes through multiple pieces of equipment as it is routed to a destination computer. If at any point a piece of equipment does not properly process the packet, the destination computer may not receive the packet.

To prevent errors in transmission from disrupting communication between a source and a destination computer, a network may operate according to a protocol under which a destination computer sends an acknowledgement to the source whenever it receives a packet. If the source computer does not receive the acknowledgement within a predetermined time-out period, it assumes that the destination computer did not receive the packet and retransmits the same packet. The source computer will repeat the transmission, up to some preset maximum number of tries, until it receives an acknowledgement. Such a protocol allows a network to operate without data loss even if some packets are corrupted or for other reasons do not reach their intended destinations.

However, the process of retransmitting a packet multiple times, each time creating a delay at least as long as the time-out period, can cause an undesirable delay when a problem exists between a source and destination. During this delay, the source computer does not recognize that a problem exists with the connection and cannot take corrective action.

To reduce the time required for a source computer to identify and react to a problem, a network protocol may specify that network equipment send a status packet to the source computer if it cannot process a packet. The Transmission Control Protocol (TCP), used on many networks, defines a set of ICMP packets to provide status information.

One problem that can interfere with the transmission of a packet over a network containing different types of equipment is that a source computer may transmit a packet that is too large for some piece of network equipment to process. For example, network equipment operating according to TCP generally supports packets with up to 576 bytes. Many pieces of network equipment support larger packets, and transmission of packets having 1,480 bytes is common. But, if a source computer transmits a packet with 1,480 bytes along a path that contains a piece of network equipment that can only process 576 bytes, the packet may not reach the destination computer.

Some network equipment that receives a packet that is too large for it to process will "fragment" the packet into two smaller packets. However, fragmentation of packets can cause other transmission problems, and TCP specifies a bit in every packet that can be set by a source computer to instruct network equipment processing the packet not to fragment it. If fragmentation is prohibited, any network device that cannot process a packet because of length will discard the packet. Regardless of the number of times a source computer retransmits that packet, it will not reach the destination computer.

To reduce the delay required for the source computer to identify that it is sending packets that are too large for a path, network equipment that cannot process the packet may send an ICMP packet to the source computer indicating that it could not process the packet. When the source computer receives the ICMP packet, it can stop waiting for an acknowledgement and can forego retransmission of the packet. The source computer can take corrective action without further delay, such as dividing the information in the packet into multiple smaller packets and transmitting those smaller packets.

However, this approach to detecting and correcting the problems in transmission caused by network equipment that cannot process large packets often does not work in practice. Some network equipment is not fully compliant with the network protocol and may discard packets that are too large without sending any ICMP packet. In addition, many computer system administrators block some or all of the ICMP packets because they can be used for improper purposes. ICMP packets, for example, may be used in denial of services attacks on a networked computer system. As a result, a source computer may not receive an ICMP message.

If no ICMP packet is sent to alert the source computer that its packet was too large for a piece of network equipment to process or if the ICMP packet is blocked from reaching the source computer, a condition called a "black hole" can be created. The source computer sends a packet but receives neither an acknowledgement that the packet was successfully received nor an indication that a problem in transmission occurred.

To avoid black holes, some commercially available communication software has included "black hole" management. For example, WINDOWS XP® operating system software provided by Microsoft Corporation includes an optional black hole management capability. A user must enable this capability, but when enabled, the communication software probes to determine whether a black hole exists for a particular connection if an attempt to transmit a large packet times out without an acknowledgement or error message. Probing for a black hole involves sending small packets. If the small packets are received successfully, but larger packets are not, the communication software may determine that a black hole exists on a particular connection. If a black hole is detected, the communication software marks a record in a data structure corresponding to the connection. Thereafter, any information sent over the connection will be sent in small packets.

SUMMARY OF INVENTION

The invention reduces overhead in computer communications that can occur from detecting or correcting for black holes as part of black hole management. In one aspect, the invention relates to the use of information to infer the black hole status of a particular connection without black hole probing on that connection. The status is used to selectively perform a black hole management operation, which may reduce the transmission delays that otherwise would occur from black hole probing.

In another aspect, the invention relates to suppressing black hole probing when available information indicates that no black hole exists on a connection. By suppressing black hole probing, the amount of time communication software spends attempting to transmit a packet is reduced.

In a further aspect, the invention relates to increasing the packet size on a connection previously identified as having a black hole when the status of that connection changes. Increasing packet size reduces delays in information transmission as a result of better performance achieved by sending larger packets.

These aspects of the invention may be used individually or in combination to reduce overhead of black hole management. The overall overhead may be reduced to a level that black hole management may be enabled by default.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Communication efficiency in a networked computer is increased with improved black hole management. Black hole management may be improved by selectively performing black hole management operations, such as probing for black holes. In some embodiments, this reduction is achieved by suppressing black hole probing based on information that indicates that no black hole is present on a connection. For example, an indication that a full-size packet has been transmitted over a connection may be used as an indication that no black hole exists on that connection. Accordingly, that information can be used to suppress probing for black holes when a packet is transmitted over that connection and no acknowledgement is received. Rather, efforts may be undertaken immediately to detect or correct other problems with the connection.

Black hole probing may also be suppressed on a connection if available information indicates that a black hole either is likely or is not likely on that connection. For example, if multiple connections share a path through the network, an indication that a black hole does not exist on that path may be used to make black hole management decisions on every connection using that path, without the need to separately probe on each connection.

Communication efficiency may also be increased by sending full-size packets over a connection that was previously identified as having a black hole when status information indicates there has been a change in the connection that may have removed the black hole. For example, if a connection is modified to change the gateway through which packets are sent, information stored for black hole management may be reset for that connection. If, as a result of a previously detected black hole, only reduced-size packets were transmitted over that connection, resetting the information may allow full-size packets to again be transmitted, increasing communication efficiency.

Black hole management according to some embodiments of the invention is implemented in communication software of a computer connected to a network. In some conventional computers, black hole management is incorporated in a communication driver, such as a driver called tcpip.sys. Improved black hole management according to the invention may likewise be implemented in a communication driver and may be implemented using programming techniques as are known in the art. However, black hole management according to the invention may be implemented in any suitable way, including in other components of a network stack, in other components in the communication software or even in hardware components, such as a network interface card.

Figure 1A:
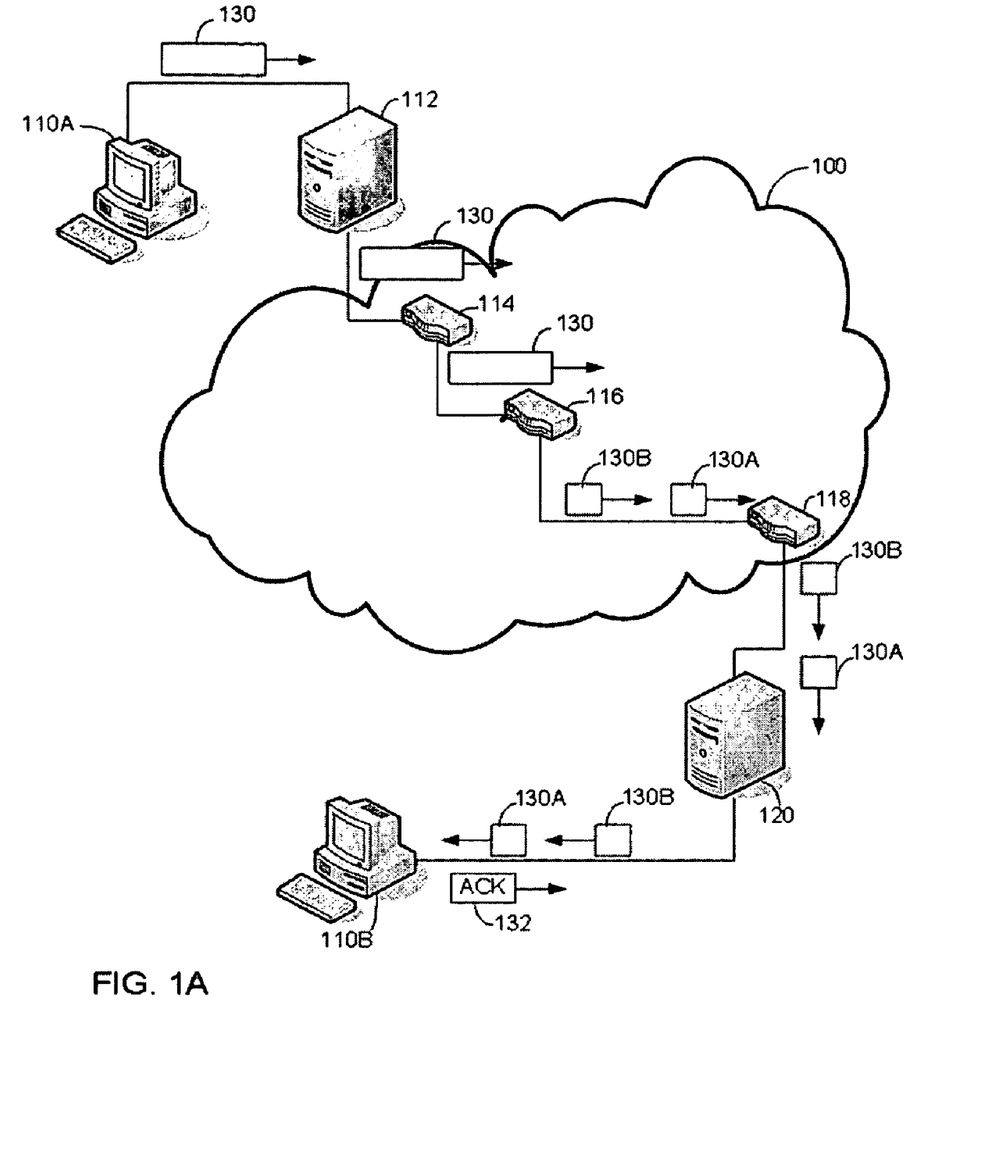
FIG. 1A is a sketch of a network in which the invention may be employed.

Turning to FIG. 1A, an example of a network in which the invention may be deployed is illustrated. The network of FIG. 1A includes a network cloud 100 that includes many interconnected network devices that provide paths for packets to be routed through network cloud 100. In this example, a source computer 110A is sending a packet 130 to destination computer 110B. Source computer 110A is connected to a server 112 that provides an interface to network cloud 100. Similarly, destination computer 110B is connected to a server 120 that provides an interface to network cloud 100. Within network cloud 100, server 112 and server 120 are connected by a path through network devices, here shown as routers 114, 116 and 118.

Packet 130 has a format prescribed by the protocol used by the computer network within network cloud 100. Many networks operate according to layered protocols. The layers allow information needed to route a packet through different parts of the network to be separately specified and processed. For example, one protocol layer may contain information needed to make connections to physical devices within a local network. Other protocol layers may contain information needed to make connections between local networks or to appropriately route information to applications within computers connected to those networks. For example, the Internet uses a layered protocol denoted TCP/IP/ARP. TCP, IP and ARP are each separate protocols defining an aspect of the transmission of information from an application resident on source computer 110A to an application resident on destination computer 110B.

The specific protocol for transmission of packet 130 is not critical to the invention. In the examples provided herein, packet 130 is transmitted with a layered protocol that includes TCP. Accordingly, when an application (not shown) within source computer 110A needs to transmit data to an application (not shown) within destination computer 110B, a TCP connection is formed. Communication software within source computer 110A stores information defining the connection between the source application and the destination application. The connection information identifies the destination application, and a path through network cloud 100 that allows information to move from source computer 110A to destination computer 110B.

In the example of FIG. 1A, packet 130 is communicated from source computer 110A to server 112. Server 112 acts as a gateway to network cloud 100. As pictured, server 112 forwards packet 130 to a device within network cloud 100. In this example, server 112 forward packet 130 to router 114. Router 114 uses header information within packet 130 to forward packet 130 to other network devices that will ultimately route the packet 130 to destination computer 110B. In this example, router 114 sends packet 130 to router 116.

In the example of FIG. 1A, router 116 is not constructed to handle a packet as large as packet 130. Accordingly, router 116 fragments packet 130 into two smaller packets 130A and 130B. Router 116 then forwards packets 130A and 130B to router 118. Router 118 then forwards packets 130A and 130B to server 120, where they are delivered to destination computer 10B.

Upon processing of packets 130A and 130B, the communication software within destination computer 110B sends an acknowledgement packet 132. Acknowledgement packet 132 passes through network cloud 100 back to source computer 110A. Upon receipt of acknowledgement packet 132, communication software within source computer 110A has confirmation that packet 130 was received, thus ending processing by source computer 110A to transmit the information in packet 130.

In the example of FIG. 1A, packet 130 was properly transmitted through network cloud 100 even though larger than router 116 could process. In this example, packet 130 is transmitted in a protocol allowing network devices processing packets to fragment packets that are too large to process. Packets transmitted using TCP may be fragmented unless a field within the packet is set to indicate that fragmentation of the packet is prohibited. Accordingly, no black hole is created in the example of FIG. 1A.

Figure 1B:
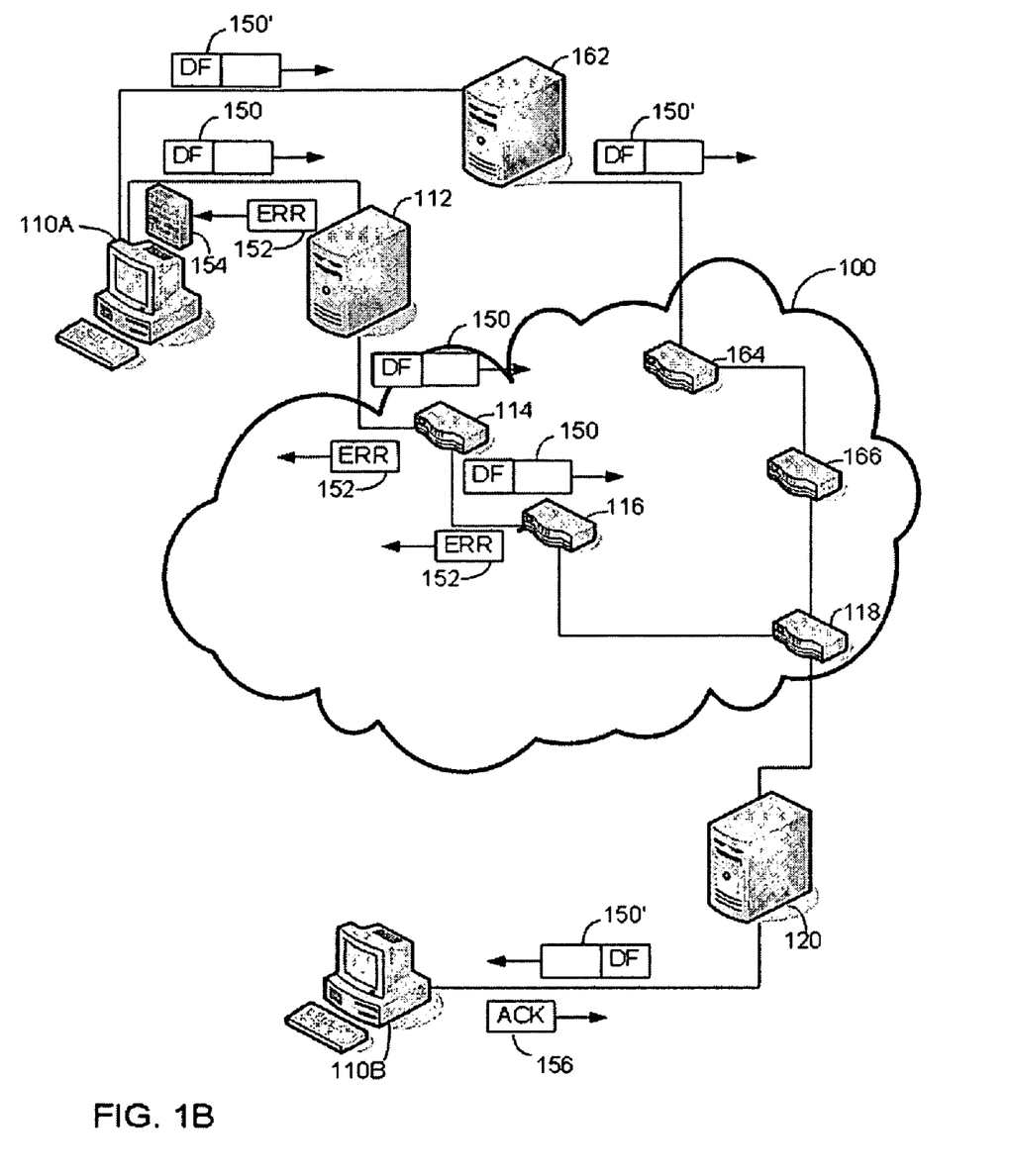
FIG. 1B is a sketch of the network of FIG. 1A when a black hole exists.

FIG. 1B illustrates a scenario in which a black hole may be created. As with FIG. 1A, source computer 110A transmits a packet to destination computer 110B. Packet 150 differs from packet 130 in that a "do not fragment" field within packet 150 is set. Information in this field signals to any network device processing packet 150 that the packet should not be fragmented when retransmitted. As with packet 130, packet 150 may pass through server 112 acting as a gateway to network cloud 100. Packet 150 is processed by router 114 and forwarded to router 116. However, because packet 150 is too large for router 116 to process without fragmentation and fragmentation of packet 150 is prohibited, router 116 is unable to forward packet 150. Packet 150 is therefore "dropped" at router 116.

Router 116 sends an error packet 152 directed to source computer 110A. Error packet 152 passes through router 114 to server 112. In the example illustrated, server 112 may attempt to provide error packet 152 to source computer 110A, but error packet 152 is blocked by firewall 154 from reaching source computer 110A. Accordingly, communication software within source computer 110A receives neither an acknowledgement that packet 150 was properly received nor an error packet indicating that the packet was dropped by a network device. Thus, FIG. 1B illustrates a condition under which a black hole is created.

As described in greater detail below, communication software within source computer 110A may detect the black hole condition illustrated in FIG. 1B. Additionally, communication software within source computer 110A may correct for the black hole condition. To correct the black hole, communication software within source computer 110A may transmit the information within packet 150 as two or more smaller packets, each of a size sufficiently small to be processed by router 116. In the example that follows, full-size packets will be described as having 1,480 bytes of information. A smaller packet size, having 576 bytes of information, is also described. However, the actual number of bytes in a larger or a smaller packet is dependent on the specific network protocol. Further, the number of available packet sizes is also dependent on the network protocol. The invention is not limited to use with packets of these sizes or in networks having only two sizes of packet. However, in the example of a TCP network, 576 bytes is a default size that all network devices operating according to the protocol should be able to process. Accordingly, reducing the packet size to 576 bytes in such a network should allow the packet to pass through a black hole, if one exists.

Thus, a black hole management system within source computer 110A may correct for a black hole by reducing the maximum packet size to 576 bytes or less. Setting the maximum packet size may be done by setting a transmission parameter sometimes described as maximum transmission unit (MTU).

A black hole management system according to embodiments of the invention efficiently identifies connections for which reduced packet sizes are desired. As described in more detail below, such efficiency may be achieved by either identifying connections for which a black hole exists or no black hole exists without the need for black hole probing. Black hole management operations can then be selectively initiated without the need for black hole probing. For example, a connection for which there is no black hole may be identified. If a packet is sent on that connection but no response is received, black hole probing may be omitted. Because black hole probing can be time consuming, selectively initiating black hole management operations without the need for probing reduces communication delays.

A second desirable feature that may be incorporated into a black hole management system within source computer 110A is also illustrated in FIG. 1B. In this example, source computer 110A has access to server 162. Server 162 serves as an alternative gateway to network cloud 100. Server 162 is connected to router 164 within network cloud 100. Because server 162 is connected to different network devices than server 112, using server 162 as a gateway to network cloud 100 may cause a path between source computer 110A and destination computer 110B to traverse different physical network devices than when source computer 110 connects to the network using server 112 as a gateway.

In this example, the path includes routers 164, 166 and 118 when server 162 is used as a gateway. As a result, router 116, which is unable to process packet 150, is bypassed, thereby avoiding the black hole at router 116. Accordingly, packet 150', which is a full size packet, reaches destination computer 110B and acknowledgment message 156 is generated.

FIG. 1B demonstrates that a black hole that exists when one gateway is used may be eliminated when another gateway is used. A black hole management system incorporated into the computer system of FIG. 1B may alter the processing performed when the source computer changes gateways for a connection between a source computer. In some embodiments, a black hole management system may reset any indication of a black hole on a particular path when the gateway to the path changes. Resetting the transmission size prevents smaller, and therefore more inefficient packets, from being used if no black hole exists. More generally, any black hole management information may be reset when the status of a connection changes.

Such a black hole management system may be implemented in the communication software of each source computer. The system may be implemented with programming techniques used for conventional black hole management software. Such a system may also operate on data stored about connections in the same way as in a conventional black hole management system.

Figure 2:
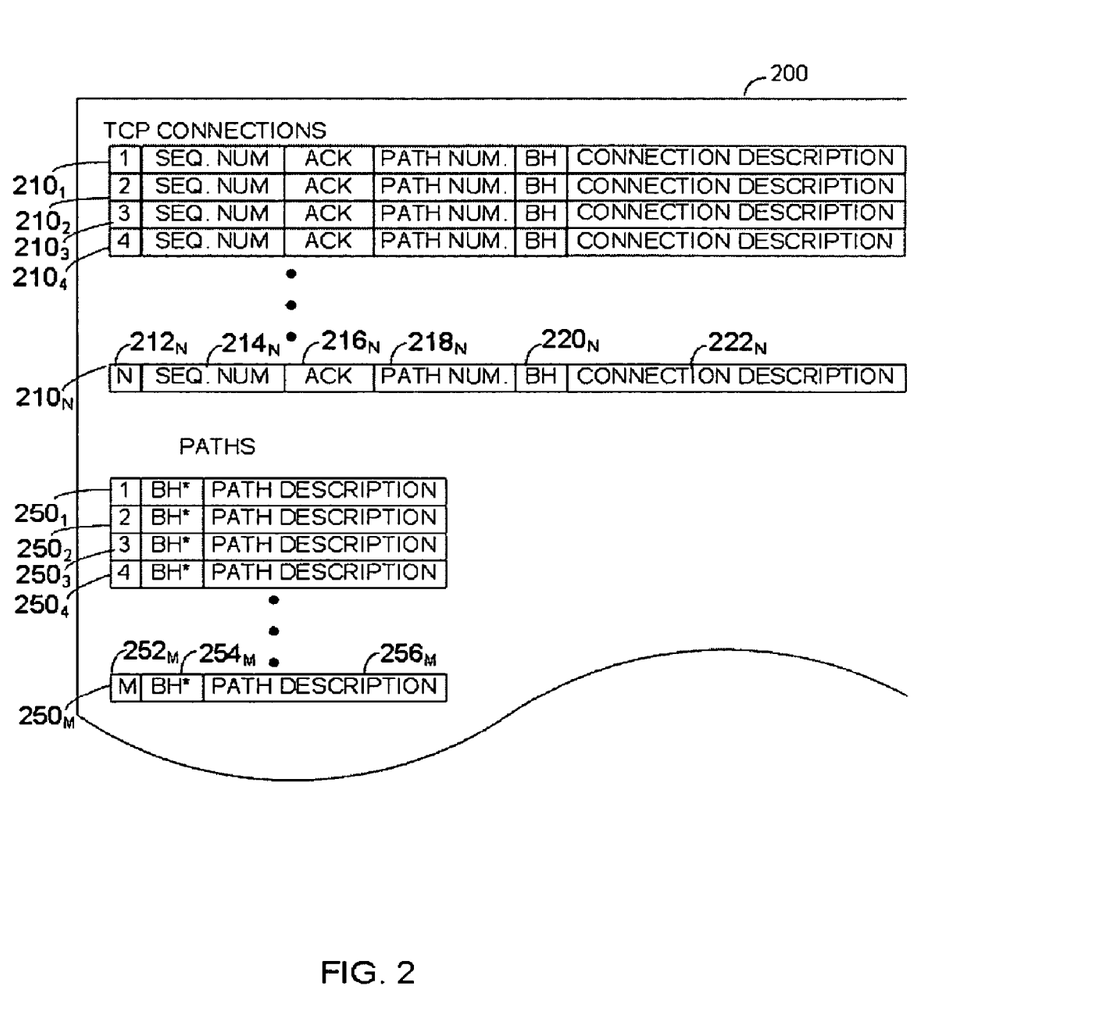
FIG. 2 is a sketch of a data structure that may be used for black hole management according to an embodiment of the invention.

FIG. 2 is an example of a data structure 200 maintained by such communication software. In this example, data structure 200 stores information used in TCP transmissions.

In a TCP transmission, a "connection" is established between a source application executing on a source computer and a destination application executing on a destination computer. Consequently, there may be many connections between a source computer and a destination computer. For ease of storage, information describing each connection may be stored separately from information describing the path between the source computer and the destination computer.

Data structure 200 includes information about TCP connections that have been established with other computers. Each connection is described in a row of data structure 200. Here rows $210_1, 210_2 \ldots 210_N$ are shown. In this embodiment, each of the rows $210_1, 210_2 \ldots 210_N$ has the same number and types of data fields. Taking row $210_N$ as illustrative, data structure 200 stores for each TCP connection information in fields $212_N, 214_N, 216_N, 218_N, 220_N$, and $222_N$.

Each connection established by the communication software may be given an identifier, here shown as a number. The number is stored in field $212_N$. It is known to use numeric identifiers for TCP connections in conventional computer systems and a numeric identifier for each connection may be established as in a conventional communication software. However, any suitable means may be established for identifying a connection.

Similarly, conventional communication software identifies a path associated with each connection. In the embodiment of FIG. 2 the path associated with the connection described by row $210_N$ is identified by the information stored in field $218_N$. In this embodiment, the value in field $218_N$ identifies a row in a different section of data structure 200 that stores information about a specific path. In the embodiment illustrated, rows $250_1, 250_2 \ldots 250_M$ each store information about a path between the computer on which data structure 200 is resident and a destination computer. Accordingly, field $218_N$ identifies a path used for connection N by storing an identifier of one of the rows $250_1, 250_2 \ldots 250_M$.

It is also conventional to store other information describing a TCP connection, such as an identifier of a source and destination application. Row $210_N$ includes a field $222_N$ that stores other information that is conventionally stored for a TCP connection. This information may be stored in any suitable way in one or more subfields in field $222_N$.

Row $210_N$ additionally includes fields for storing information useful for black hole management. Field $220_N$ stores an indicator of whether a black hole has been identified in the connection described by row $210_N$. Field $220_N$ may, in a simple embodiment, be a single bit that is set when a black hole is detected. Field $220_N$ may be set following black hole probing on the connection as in a conventional system.

Additionally, row $210_N$ stores information useful in identifying whether connection N is free of black holes. In this embodiment, that information is stored in fields $214_N$ and $216_N$. Field $214_N$ stores an identifier of a full-length packet transmitted over connection N. As is known, packets transmitted in a TCP format include sequence numbers so that each packet may be uniquely identified. The sequence number is also used in acknowledgment packets, which allows sending computers to identify which of the packets they have transmitted have been received. Accordingly, the communication software managing data structure 200 may determine when the packet identified by the information in field $214_N$ has been acknowledged. The value in field $216_N$ may be a Boolean value indicating whether the packet identified by the information in field $214_N$ was acknowledged. This information is useful for identifying that no black hole exists on connection N. If the full-size packet identified by field $214_N$ is acknowledged, there can be no black hole in connection N. As will be described in greater detail in connection with FIGS. 3 and 4 below, this information is used to suppress checking for black holes, thereby reducing communication delays attributable to black hole management.

In the embodiment of FIG. 2, the path defined in field $218_N$ is more fully defined in a separate row in a data structure. In FIG. 2, rows $250_1, 250_2 \ldots 250_M$ are shown defining paths. By separately defining paths and connections, more than one connection may refer to the same path. In the embodiment illustrated, each the rows $250_1, 250_2 \ldots 250_M$ contains the same number and types of data fields. Taking row $250_M$ as illustrative, each row defining a path has a field $252_M, 254_M$ and $256_M$. Field $252_M$ contains an identifier of the path. Here, each path has a numeric identifier, but any suitable means for identifying a path may be used.

Each path is also identified by a path description field, such as field $256_M$. In a TCP packet, a path is described by address information necessary to transmit data between a source computer and a destination computer. Path description field $250_N$ stores sufficient information to allow a packet to be appropriately addressed. Any conventional means of providing this information may used and may be stored in one or more subfields of path description field $250_N$.

In addition, row $250_N$ includes a field $254_N$ providing information about the black hole state of path M. In the pictured embodiment, field $254_M$ stores an indication that no black hole exists on path M. Such an indication may be stored, for example, following acknowledgement of a full-size message transmitted over path M. However, different or additional information may be stored indicating the black hole state of path M. For example, the black hole state of path M may alternatively or additionally include an indication that a black hole has been detected upon path M. This information concerning the black hole state of path M may be used to control whether black hole probing is performed on any connection that uses path M. In some embodiments of a black hole management system according to the invention, black hole probing is suppressed on any connection using a path for which the black hole state is known.

In operation, data structure 200 may be used by communication software that implements a black hole management system. The black hole management system may be implemented as part of the communication software in the operating system of a source computer. The communication software may be part of the network stack of the operating system. As a specific example, the black hole management system may be in a driver, such as the driver tcpip.sys as exists in a conventional computer operating system.

Figure 3:
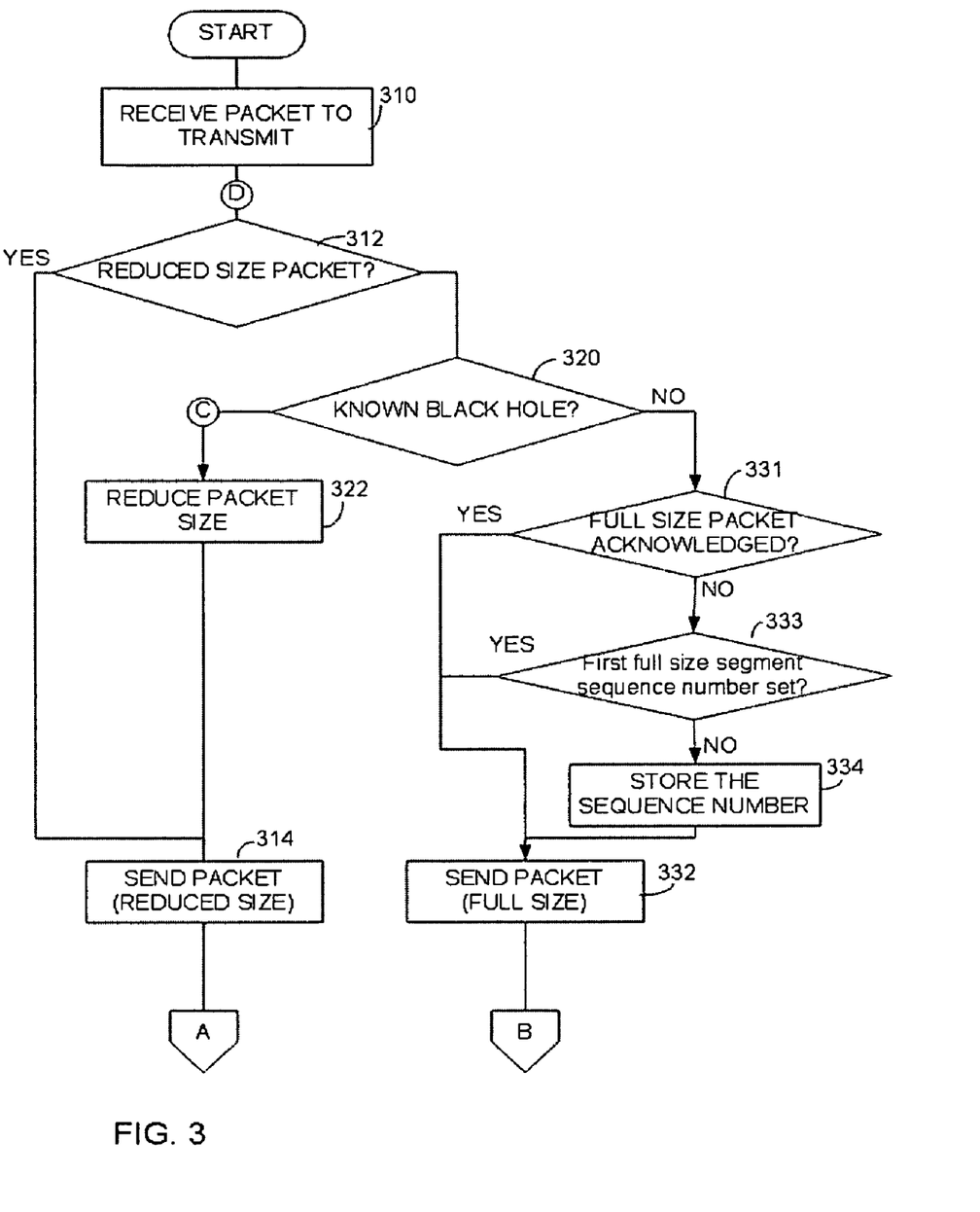
FIG. 3 is a flowchart of a portion of a process of transmitting a packet according to an embodiment of the invention.

Regardless of specific implementation, FIG. 3 illustrates an example of processing that may be performed by the black hole management system. In the embodiment of FIG. 3, the process begins at step 310 where communication software receives a packet to transmit. In the example of software that transmits TCP packets, a packet is received at block 310 with a designation of a connection over which the packet is to be transmitted.

Processing then proceeds to decision block 312. At decision block 312, the process branches based on the size of the packet to be transmitted. In the embodiment illustrated in FIG. 3, packets may be of one of two sizes, reduced or full size. In the illustrated embodiment, reduced-sized packets have 576 bytes or less. Full size packets have more than 576 bytes. However, these specific numbers are illustrative. More generally, reduced size packets have a size that should be processed by any network device. Full size packets have a larger size that may not be handled by all network devices.

Regardless of the specific packet size, processing proceeds to block 314 when the packet to be transmitted is of reduced size. At block 314, the reduced sized packet is transmitted. Transmission at block 314 may be performed as in conventional communication software. Following transmission, processing proceeds to connection point A, also indicated in FIG. 4A.

Conversely, if the packet to be transmitted is not of reduced size, processing proceeds from decision block 312 to decision block 320. At decision block 320, the process branches based on whether there is a known black hole associated with the connection through which the packet is to be transmitted.

If the connection has a black hole, only reduced size packets are transmitted. Accordingly, the process branches to block 322 where the size of the packet to be transmitted is reduced. Any suitable mechanism for reducing the packet size may be used. In one embodiment, packet size is reduced by breaking the packet for transmission into one or more smaller packets. Once each packet is of reduced size, the process proceeds to block 314 where the reduced size packets are transmitted as described above.

Conversely, if there is no known black hole on the connection over which the packet is to be transmitted, processing proceeds from decision block 320 to decision block 331. At decision block 330, a check is made whether a full-size packet has been previously acknowledged on the connection for which the packet to be transmitted is destined. If a full-size packet has been previously transmitted and acknowledged, processing proceeds to block 332 where the packet is transmitted. As with block 314, transmission at block 332 may be performed according to conventional packet transmission techniques. Though, after the full-size packet is transmitted at block 332, processing proceeds to connection point B, also indicated in FIG. 4B.

Conversely, if no full-size packet has previously transmitted and acknowledged over the connection, processing proceeds from decision block 331 to decision block 333. At decision block 333, processing to store information necessary to identify whether a full size packet is successfully transmitted over the connection is performed. In this embodiment, at decision block 333, a check is made whether the sequence number of a full size packet has been previously stored in association with the connection in use. If a sequence number has been previously stored, processing proceeds to block 332, where the packet is transmitted.

Conversely, if a sequence number has not been stored on the connection, processing proceeds to block 334. At block 334, an indication that a full-size packet is being transmitted over the connection is stored. Where the processing of FIG. 3 is used in conjunction with data structure 200 (FIG. 2), processing at block 334 may be performed by storing the sequence number of the packet to be transmitted in a sequence number field, such as $214_N$, in a row of data structure 200 associated with the connection over which the packet is to be transmitted. Once information is stored at block 334, processing then proceeds to block 332 where the packet is transmitted as described above.

Figure 4A:
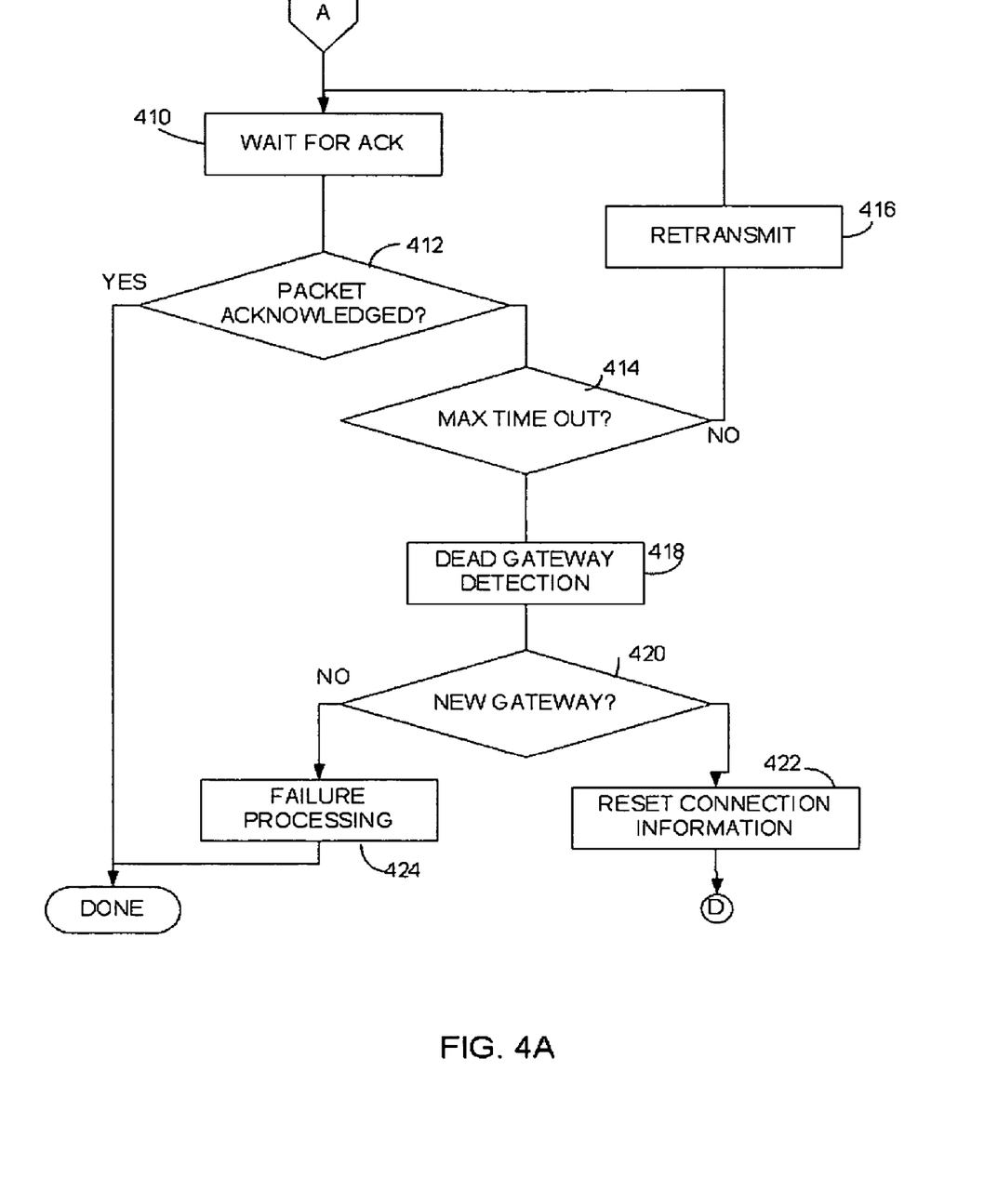
FIG. 4A is a flowchart of a portion of a process of transmitting a packet according to an embodiment of the invention.

As described above, when a reduced-sized packet is transmitted at block 314, processing continues at connection point A as shown in FIG. 4A. Accordingly, the next processing step following transmission of a reduced-size packet occurs at block 410. At block 410, the process waits for an acknowledgment for the packet. The process may wait at block 410 until an acknowledgement is received or until some time-out period has passed. The time-out period used at block 410 may be as used in a conventional communication system.

Once the processing at block 410 is completed, the process continues to decision block 412. The process branches at decision block 412 depending on whether the transmitted packet was acknowledged or a time-out occurred. If the transmitted packet was acknowledged, processing of the packet is completed and the process branches accordingly.

Conversely, if the packet was not acknowledged, processing proceeds from decision block 412 to decision block 414. At decision block 414, a determination is made whether the same packet has been transmitted some predetermined number of times without receiving an acknowledgement. In this embodiment, up to two transmission attempts are made. If the packet has not already been transmitted the maximum number of tries, processing proceeds to block 416 where the packet is retransmitted. Processing then loops back to block 410 and the process steps of checking for an acknowledgement or time-out are repeated.

Conversely, if a packet has been retransmitted twice, processing proceeds from decision block 414 to block 418. At block 418, an attempt is made to determine whether the gateway being used for the connection over which the packet to be transmitted was sent is still active. Processing at block 418 may use a "dead gateway detection" algorithm as used in conventional communication software. However, any suitable method of determining whether the gateway is still active may be used.

Processing then proceeds to decision block 420. At decision block 420, a determination is made whether the gateway is "dead" and if an alternative gateway is available. If the processing at block 418 did not detect a dead gateway or, alternatively, if no alternative gateway is available, the communication software is unable to transmit the packet. Accordingly, processing proceeds to block 424 where failure processing on the packet is performed. Failure processing at block 424 may include notifying a user of the computer on which the communication software resides that communication over a specific connection failed. Alternatively, any suitable failure processing may be performed at block 424. Regardless of the specific failure processing steps performed at block 424, processing of the packet is completed following failure processing at block 424.

Conversely, if processing at block 418 identified that the gateway being used to transmit the packet was no longer available and an alternative gateway is available, processing proceeds from decision block 420 to block 422. Processing at block 422 includes associating the connection with a new gateway. In the example network architecture of FIG. 1B, such processing may be comparable to switching from using server 112 as a gateway to using server 162 as a gateway. As described in connection with FIG. 1B, switching from server 112 to server 162 may change the black hole status of a connection. Accordingly, processing at block 422 also resets black hole management information for the connection. In an embodiment using a data structure in the form of data structure 200 (FIG. 2), resetting the black hole management information may involve erasing a sequence number stored in field $214_N$, resetting the value in acknowledgement field $216_N$ and resetting the value in field $220_N$. Similarly, information stored in connection with a path identified by the data in field $218_N$ may likewise be reset. Specifically, a field, such as $254_M$, identifying the black hole status of a path, may be reset for the path used by the connection through which the packet to be transmitted was destined.

Once a new gateway is established, processing loops back to the point identified as D in FIG. 3. Processing to transmit the packet is then repeated.

Figure 4B:
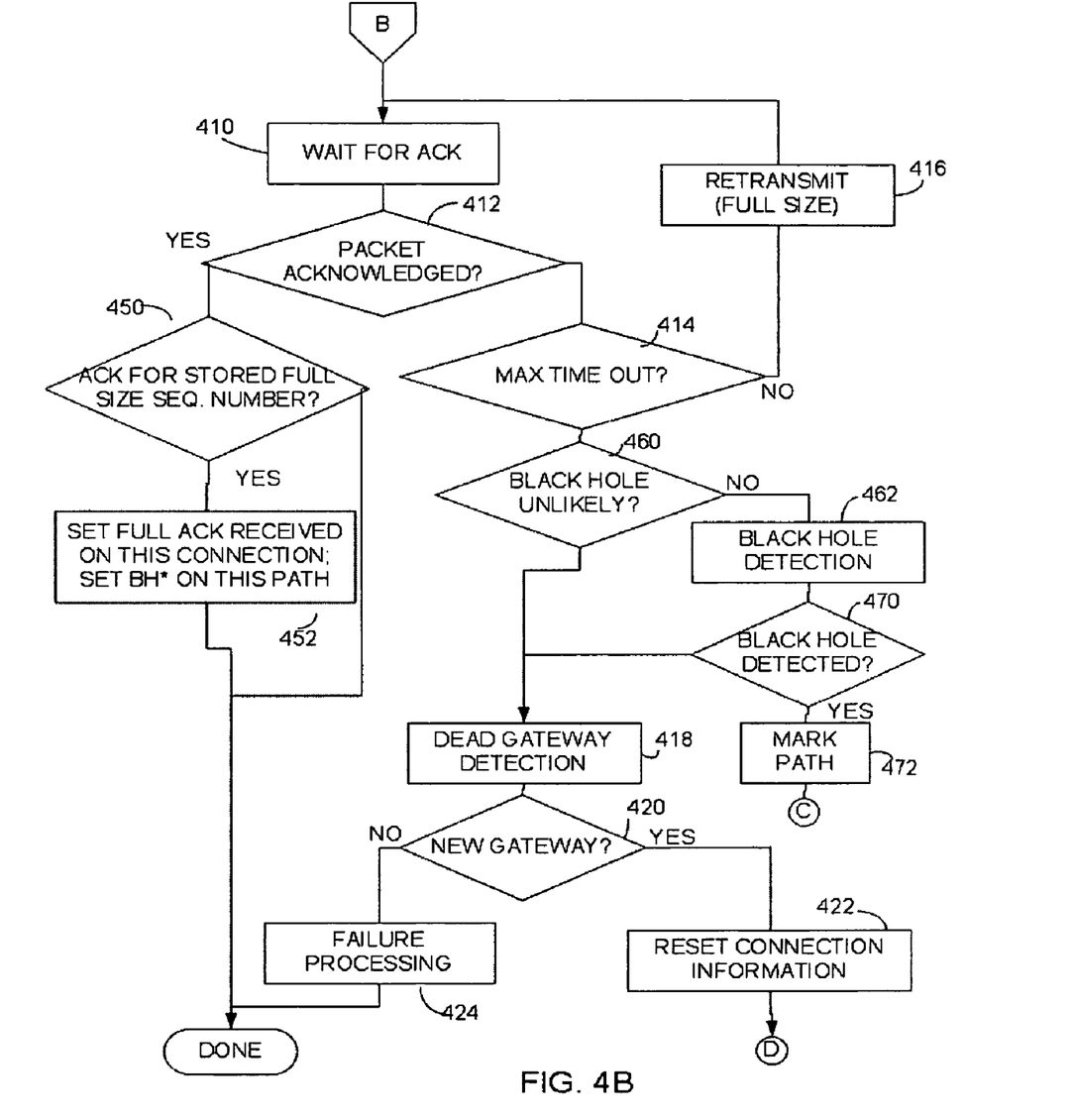
FIG. 4B is a flowchart of a portion of a process for transmitting a packet according to an embodiment of the invention.

When the packet transmitted is a full-size packet, processing proceeds from block 332 (FIG. 3) to the connection point identified B in FIG. 4B. As with the processing in FIG. 4A, processing following transmission of a full-size packet begins at block 410 where the process waits either until an acknowledgement of the packet is received or until some time-out period has passed.

Processing then proceeds to decision block 412. At decision block 412, the process branches depending on whether the packet was acknowledged or the process timed out waiting for an acknowledgement. If the process was acknowledged, processing proceeds to decision block 450.

At decision block 450, a determination is made whether the received acknowledgement represents the first acknowledgement of a full-size packet received on the connection used to transmit the packet. In the described embodiment, if the acknowledgement received at block 410 corresponds to the sequence number stored at block 334, an indication is made that the connection is able to handle full-size packets. Accordingly, FIG. 4B shows the process proceeding from decision block 450 to block 452. In the illustrated embodiment in which the communication software interacts with a data structure in the form of data structure 200 (FIG. 2), processing at block 452 stores a value in field $216_N$ associated with the connection over which the packet was transmitted.

The connection over which communication of a full size packet occurred is unlikely to contain a black hole. Accordingly, processing at block 452 also sets the value BH*, such as in field $254_M$, for the path associated with the connection.

Conversely, if the received acknowledgement is not the first for that connection, processing at block 452 is bypassed. Regardless of whether an indication of the acknowledgement is stored at block 452, upon receipt of an acknowledgement for the packet, the processing of the packet is completed.

When no acknowledgement is received at block 410, the process branches from decision block 412 to decision block 414. As described above in connection with FIG. 4A, the communication software will attempt to transmit each packet some maximum number of times. If that maximum number of times has not been exceeded, processing proceeds from decision block 414 to block 416 where the packet is retransmitted. Thereafter, processing loops back to block 410.

Conversely, if the maximum number of times is exceeded, processing proceeds from decision block 414 to decision block 460. At decision block 460, a check is made as to whether a full-size packet has been previously transmitted successfully over the connection. For communication software interacting with a data structure in the form of data structure 200 (FIG. 2), decision block 460 may determine whether a previous full-size transmission was successful by examining the contents of a field $254_M$ stored for a path used by the connection over which the packet was transmitted. If, as determined at decision block 460, a previous full-size transmission was successful such that a black hole is unlikely, black hole probing is omitted.

Rather than perform black hole probing, the process proceeds to block 418. As described above in connection with FIG. 4A, at block 418, the communication software probes to determine whether the gateway through which the packet was transmitted is still active. Also as described above in connection with FIG. 4A, following block 418, the process branches depending on whether a new gateway is assigned for the connection. If so, the process proceeds to block 422 where connection information is reset and the process returns to point D (FIG. 3). Conversely, when no new gateway is assigned, failure processing is performed at block 424 and the process terminates.

When a full-size packet could not be transmitted over a connection and no full-size packet has been previously successfully transmitted over that path, processing proceeds from decision block 460 to block 462. At block 462, a black hole probe is executed. The black hole probe executed at block 462 may be a black hole probe as used in conventional communication software. In some embodiments, a black hole probe may be implemented by sending one or more reduced sized packets over the connection. If an acknowledgement is received to a reduced sized packet but no acknowledgement is received from a full-sized packet, processing at block 462 indicates the presence of a black hole. However, any suitable method of black hole detection may be used.

Following black hole detection at block 462, processing proceeds to decision block 470. At decision block 470, the process branches depending on whether a black hole was detected. If no black hole was detected, processing proceeds to block 418. Processing at block 418 is as described above.

Alternatively, if a black hole was detected, processing proceeds from decision block 470 to block 472. At block 472, an indication that a black hole was detected is stored. For communication software using a data structure such as data structure 200 (FIG. 2), an indication of a black hole may be made by setting the value in field $220_N$. However, any suitable means of indicating that a black hole has been detected on a connection may be used.

Regardless of the specific method used to indicate that a black hole has been detected, once all affected connections have been marked, processing loops back to the point identified as C in FIG. 3. From point C, the packet to be transmitted is processed in the way described above for a packet to be transmitted over a connection known to have a black hole.

Thus, the processing illustrated in FIGS. 3, 4A and 4B provides an example of an efficient black hole management system. In this specific example, efficiency may be increased by resetting connection information at block 422 when the connection changes in a way that could remove a black hole. As a result of this processing, inefficient reduced sized packets are not transmitted on a connection from which a black hole may have been removed.

Efficiency also is improved by reducing the scenarios in which black hole probing is performed. By storing an acknowledgement at block 452, black hole status information on multiple connections may be available at decision block 460 to allow a decision to omit black hole probing. The need for black hole probing is also reduced by sharing information about a path among all connections that use the path.

Having thus described several aspects of at least one embodiment of this invention, it is to be appreciated that various alterations, modifications, and improvements will readily occur to those skilled in the art. For example, described embodiments transmit "packets." Such a term is not intended to convey that the invention is limited to any specific protocol. The term "packet" is used in a generic sense to indicate related information transmitted over a network.

Also, FIGS. 3, 4A and 4B illustrate processing of one packet. The order of the steps is illustrative and steps may be performed in any suitable order. Moreover, the processing is shown for one packet only. This processing may be interrupted by processing of other packets or by other operations of the computer on which the illustrative communications software executes.

As another example, when a black hole is detected on one connection, processing at block 472 may store indications that black holes exist for other connections that share a path with that connection. Such indications may be stored in any suitable way. For example, a search may be made through the records $210_1$, $210_2$ ... $210_N$ for any connection containing a path identifier that is the same as the path identifier for the connection on which the black hole was detected. Alternatively, it is not necessary that an indication of a black hole be stored in a record identifying a connection. As an alternative, an indication of a black hole may be stored as a field in a record $250_1$, $250_2$ ... $250_M$ identifying a path. By marking the path as containing a black hole, all connections that use the path will be simultaneously marked as containing a black hole.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a non-transitory computer readable medium (or multiple non-transitory computer readable media) (e.g., a computer memory, one or more floppy discs, compact discs, optical discs, magnetic tapes, etc. are examples of non-transitory computer readable media understood by person of ordinary skill in the art) encoded with one or more programs that, when executed on one or more computers or other processors, perform methods that implement the various embodiments of the invention discussed above. The non-transitory computer readable medium or media can be used, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a computer system connected to a network, the method comprising:
    a) determining, by a device, information relating to a first connection between an end point on the computer system and an end-point on a remote computer system, wherein:
        the computer system employs a path to transmit data to the remote computer system for the first connection,
        the path is employed by the computer system to transmit data to the remote computer system for a second connection, and
        the information is determined based on whether a black hole exists on the second connection without performing black hole probing on the first connection; and
    b) selectively initiating a black hole management operation on the first connection based on the determined information, wherein selectively initiating the black hole management operation comprises:
        when the determined information indicates that there is the black hole on the second connection, setting a maximum packet size on the first connection to a reduced level.

2. The method of claim 1, wherein selectively initiating the black hole management operation comprises, when the determined information indicates that there is no black hole on the first connection, suppressing black hole probing on the first connection in response to transmission on the first connection of a packet for which no response is received.

3. The method of claim 2, wherein suppressing black hole probing on the first connection occurs when previously determined information indicates that a packet of a size exceeding a threshold transmitted on the first connection was previously acknowledged.

4. The method of claim 3, further comprising initiating dead gateway detection in response to the transmission on the first connection of the packet for which no response is received.

5. The method of claim 1, wherein selectively initiating a black hole management operation comprises performing dead gateway detection without performing black hole probing.

6. The method of claim 1, wherein setting the maximum packet size on the first connection to the reduced level comprises setting a maximum transfer unit (MTU) on the first connection to 576 bytes or less.

7. The method of claim 6, further comprising:
    c) altering a gateway associated with the first connection; and
    d) setting the maximum packet size on the first connection to a value greater than the reduced level.

8. The method of claim 7, wherein the act d) of setting the maximum packet size comprises setting a maximum transfer unit (MTU) on the first connection to 1,480 bytes or more.

9. A non-transitory computer-readable medium having computer-executable instructions for performing steps comprising:

a) recording information indicating whether a packet transmitted over a first connection did not encounter a black hole, the first connection having a path associated therewith; and b) when a transmission attempt fails for a packet being transmitted over a second connection having the path associated therewith, selectively performing black hole probing based at least in part on the recorded information, wherein the selectively performing the black hole probing comprises:

when the recorded information indicates that that there is the black hole on the first connection, performing the black hole probing on the second connection, and when the recorded information indicates that that there is no black hole on the first connection, omitting the black hole probing on the second connection.

10. The non-transitory computer-readable medium of claim 9, wherein the computer-executable instructions for selectively performing probing based at least in part on the recorded information comprise computer-executable instructions for performing black hold probing when the recorded information does not indicate that no black hole was encountered.

11. The non-transitory computer-readable medium of claim 9, wherein the computer-executable instructions are a portion of an operating system for a computer.

12. The non-transitory computer-readable medium of claim 9, wherein the computer-executable instructions for selectively performing black hole probing based at least in part on the recorded information comprise computer-executable instructions for omitting a black hole probing operation when the recorded information indicates that no black hole was encountered.

13. An apparatus comprising:

a processor; and a computer-readable medium having stored thereon a data structure, the data structure comprising:

a) a plurality of records, each record representing a connection between an end point on the apparatus and an end-point on a remote computer system, wherein:

the apparatus employs a path to transmit data to the remote computer system for the connection, the path is employed by the apparatus to transmit data to the remote computer system for a second connection, the processor maintains the data structure when the end point on the apparatus communicates with the end point on the remote computer system using the connection, and each record comprising:

i) a first data field containing data identifying the connection; and ii) at least one second data field containing data indicating whether a packet of a size exceeding a threshold previously transmitted over the connection was acknowledged, wherein the processor:

updates the at least one second data field when a packet of a size exceeding the threshold transmitted over the connection is acknowledged; and in response to an attempt to transmit a packet over the second connection, receives an indicator when the packet was not successfully transmitted over the second connection, and in response to receiving the indicator, accesses the data structure to selectively perform black hole probing on the second connection, wherein the selectively performing the black hole probing comprises:

suppressing the black hole probing on the second connection when the at least one second data field of the data structure contains a value indicating that the packet of the size exceeding the threshold previously transmitted over the connection was acknowledged, and performing the black hole probing on the second connection when the at least one second data field of the data structure does not contain the value.

14. The apparatus of claim 13, wherein the at least one second data field comprises:

A. a sequence number field containing data identifying the packet of the size exceeding the threshold transmitted over the connection; and B. an acknowledgement field containing data indicating whether an acknowledgement was received to the packet of the size exceeding the threshold identified in the sequence number field.

15. The apparatus of claim 13, further comprising:

b) a second plurality of records, each record of the second plurality of records comprising:

i) a first field containing data identifying a path; and ii) a second field containing data identifying whether a packet of a size exceeding a threshold was transmitted on the path without encountering a black hole, wherein the processor updates the at least one second data field of the record of the second plurality of records when a packet of a size exceeding the threshold was transmitted on the path without encountering the black hole.

16. The apparatus of claim 15, wherein each of the plurality of records identifying a connection comprises a third field containing data identifying a record in the second plurality of records.

17. The apparatus of claim 15, wherein the data identifying whether a black hole was detected on a connection employing the path comprises data indicating that a no black hole was detected.

18. The apparatus of claim 15, wherein each of the plurality of records identifying a connection identifies a TCP connection.

19. The apparatus of claim 15, further comprising computer-executable instructions for changing a gateway associated with a path and, when the gateway is changed, resetting the second field containing data identifying whether a black hole was detected on the connection employing the path.

* * * * *